United States Patent

[11] 3,588,806

[72] Inventor Merton Wilcox
    Sarasota, Fla.
[21] Appl. No. 605,493
[22] Filed Dec. 28, 1966
[45] Patented June 28, 1971
[73] Assignee Sarasota Engineering Co., Inc.
    Sarasota, Fla.

[54] SELECTIVE VEHICLE DETECTOR
    2 Claims, 5 Drawing Figs.
[52] U.S. Cl. .................................................. 340/38,
                                          340/258, 340/282
[51] Int. Cl. .......................................... G08b 13/00,
                                                  G08g 1/00
[50] Field of Search .......................................... 340/38, 33,
    282, 224, (Inquired), 258, 51;
    179/82, 1; 343/225, (Inquired); 325/117

[56]         References Cited
         UNITED STATES PATENTS
1,610,692  12/1926  Logwood...................... 340/38
3,115,622  12/1963  Jaffe............................. 340/224
3,341,813   9/1967  Fletcher et al................ 340/282UX
2,588,879   3/1952  Richards ...................... 340/258UX
3,041,507   6/1962  Rose et al. ................... 343/225X
3,111,644  11/1963  Froelich et al................ 325/117

Primary Examiner—Donald J. Yusko
Attorneys—George H. Baldwin and Arthur G. Yeager ABSTRACT: A small continuously operating tuned signal generator device including a tank coil and comprising a clamp for attachment of the device to a vehicle with the tank coil generally horizontal and a cooperative receiver including a loop adapted to be buried connected to a receiver tuned to the frequency of the signal generator whereby the appearance of the vehicle over the loop actuates the receiver.

Patented June 28, 1971 3,588,806

INVENTOR.
Merton Wilcox
BY George H. Baldwin
ATTORNEY

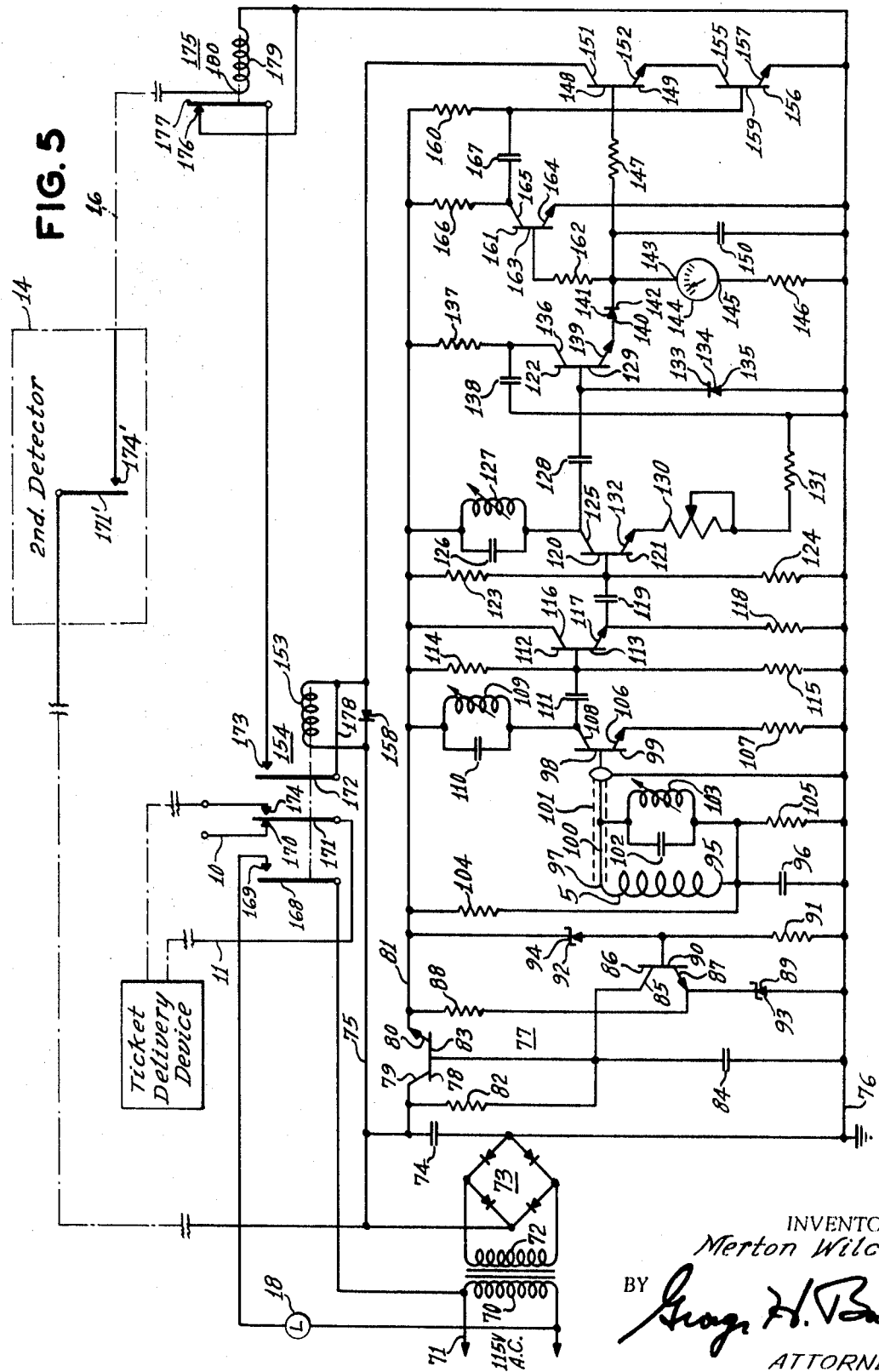

SELECTIVE VEHICLE DETECTOR

This invention pertains to selective vehicle detection systems and more particularly to a system comprising a tuned continuously operative signal generator carried by a vehicle and a cooperative receiver arranged to provide an output signal, and, preferably, to actuate a switching relay, when the signal generator is in close proximity to the receiver.

A general object of the invention is to provide a small, compact self-powered tuned signal generator readily attachable to a movable object, such as an automotive vehicle, and a cooperative selective detector for responding to the presence of such generators tuned to the same selected frequency.

It is a further object of the invention to provide a mobile tuned signal generator operative at a radio frequency and with a very small range and a cooperative tuned receiver arranged for inductive coupling to the signal generator and substantially nonresponsive to fields other than the field of such generators tuned to the same frequency when in close proximity to the receiver.

The system has specific utility in connection with the operation of automobile parking facilities which may be arranged to admit automatically vehicles provided with a properly tuned signal generator. It will be apparent that the system has other utility and is adapted for use in connection with guarded vehicle parking space at industrial locations, or to secure admittance to toll roads, to cause actuation of residence garage doors or for other purposes.

Many automobile parking lots and parking garages are intended for use by monthly or yearly contract parkers and for transient parkers, and automatic operations are much to be desired. Automatic arrangements are presently in use to deliver a dated time ticket to the driver upon entering a parking area, such arrangements comprising a treadle, or other vehicle sensing device, and an automatic ticket delivery device controlled by the sensing device. Such arrangements, of course, result in the issuance of a ticket for each automobile with consequent inconvenience to contract parkers.

A specific object of the invention is to provide means for distinguishing between transient and contract parkers and for disabling automatically the ticket delivery device when the arriving vehicle is to be parked on contract.

This invention may find utility in an automobile parking facility of the type wherein the vehicle entrance is provided with an automatic ticket issuing device, such as is known in the art as a "ticket spitter," and a means to respond to vehicles, such as a treadle, a photocell and light beam, an electronic vehicle presence or approach detector, or the like, for actuating the issuing device to deliver a ticket stamped with the date and time to the driver of each arriving vehicle. In such a parking facility, according to the present invention, each vehicle which is covered by a term parking contract, such as for a monthly, a half-yearly or a yearly term, is provided with a compact, rugged, readily attachable and detachable, self-contained, continuously operative signal generator or high frequency source, each such source being tuned to the same predetermined frequency, attached under the vehicle body, such as to a convenient part of the frame, and the entrance path or driveway for entering vehicles is provided with at least one detector, tuned to the predetermined frequency, and operative in response to the arrival or presence of any one of the high frequency sources tuned to that predetermined frequency to disable the ticket-issuing arrangement so as to prevent the issuance to a ticket to the driver of the vehicle carrying such source. While the system may be provided with time delay means for returning the ticket issuing arrangement to normal operating condition within a short time after being so disabled so that it is prepared to issue a ticket to the next arriving transient parker, it is preferred that the detector be arranged to hold itself in energized condition upon and following actuation by an arriving vehicle having a high frequency source, and that a second detector be provided spaced a short distance along the entrance path to be actuated by the high frequency source as the vehicle leaves the vicinity of the ticket issuing device, and that this second detector be connected to return the first detector to deenergized or standby condition and thus to reenable the ticket issuing arrangement. Such a system is shown and described herein to illustrate the invention.

As an alternative to the provision of a second detector, the treadle or other vehicle detecting means provided for triggering the ticket issuing arrangement, or a second similar treadle or other vehicle detector, may be connected to unlatch the tuned detector as a vehicle carrying a high frequency source passes beyond the ticket issuing device.

Should it be desired, a gate may be provided at the entrance which will automatically open only for contract parkers which carrying a high frequency source, the switching circuit of the detector according to the invention being arranged to actuate gate opening means.

Suitable counters may be connected to the detector for contract parking vehicles and to the treadle, as well as to detectors at the exit from the facility, to permit the persons in charge to deny access to the facility to transient parkers when there are only sufficient parking spaces remaining to accommodate contract parkers, or, if desired, to operate automatic controls for the entrance to forbid or prevent entrance of transients.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 5 is a circuit diagram of a detector in accord with the invention.

Figure 1:
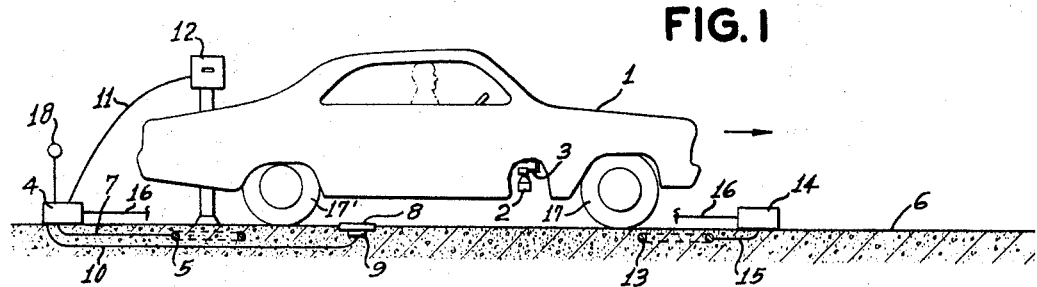
FIG. 1 is a diagrammatic representation showing a preferred form of parking facility entrance system embodying the invention.

Referring to FIG. 1 of the drawings, the contract parking vehicle 1 carries a high frequency source 2 attached to any convenient lower frame member 3. A detector is shown which includes a cabinet 4 and a loop or coil 5 buried in the pavement 6 of the vehicle pathway along which pass vehicles to be detected, such as at the entrance to a parking facility. Wires 7 connect the coil 5 to electronic components within the cabinet 4.

A ticket issuing system is shown which comprises a treadle 8 for operating a switch 9 in response to passage of the wheels of a vehicle, and the switch 9 is connected by wires 10 to a normally closed switch in cabinet 4, as later described, and thence through wires 11 to the ticket issuing device 12. It will be understood that the treadle and ticket issuing device per se form no part of this invention and may comprise arrangements well known in the art.

Further seen in FIG. 1 is a second detector comprising a coil 13 buried in the pavement further along the path of the vehicle and a cabinet 14, containing components preferably identical to those in cabinet 4, connected to coil 13 by wires 15. A switch in cabinet 14 is connected by wires 16 to components in cabinet 4 of the first detector.

In operation, the wheels of an arriving vehicle depress treadle 8 causing switch 9 to close and, normally, in the case of a transient parking vehicle which carries no source 2, to actuate the device 12 to deliver a ticket stamped with the time and date. If the arriving vehicle carries a properly tuned high frequency source 2, matching the tuning of detector 4, 5 the detector will have been operated through inductive coupling between source 2 and detector coil 5 shortly before the front wheels 17 of the vehicle have depressed treadle 8, and detector 4, 5 will have been energized into a condition in which switch 9 is disconnected from the issuing device 12. When in such energized condition, the detector 4, 5 preferably operates to cause a suitable indicator such as pilot light 18 to be "on."

As the vehicle carrying source 2 continues along the entrance path, its rear wheels 17' pass over and beyond treadle 8, and thereafter the source 2 passes over coil 13, causing the switching means (later described) of the second detector 14 to so control the first detector that it returns into standby or unlatched condition ready for subsequent actuation upon the arrival of the next vehicle which carries a high frequency source 2. With detector 4 in standby condition, treadle switch 9 is connected to device 12 whereby tickets are issued to vehicles which are not provided with a frequency source 2.

It may be noted that, for vehicles not provided with a source 2, the treadle and ticket issuing device operates, as is known in the art, to deliver a ticket for every second depression of treadle 8 whereby the passage of the rear wheels of a vehicle do not cause a second ticket to be delivered. Alternatively, the treadle switch circuit may be disabled after the front wheels have caused a ticket to be partially ejected until the ticket is pulled from the device, and to remain disabled thereafter until the rear wheels of the vehicle have passed the treadle. The present system is compatible with any such arrangement since the detector coil 5 is so placed as to be energized by coupling with the source 2 and, in response, to cause disconnection of the treadle switch 9 from device 12 before the front wheels 17 reach treadle 8, and the coil 13 is so placed as to cause detector 4, 5 to return to standby condition and to reconnect switch 9 to device 12 only after the rear wheels 17' have passed the treadle 8.

Figure 2:
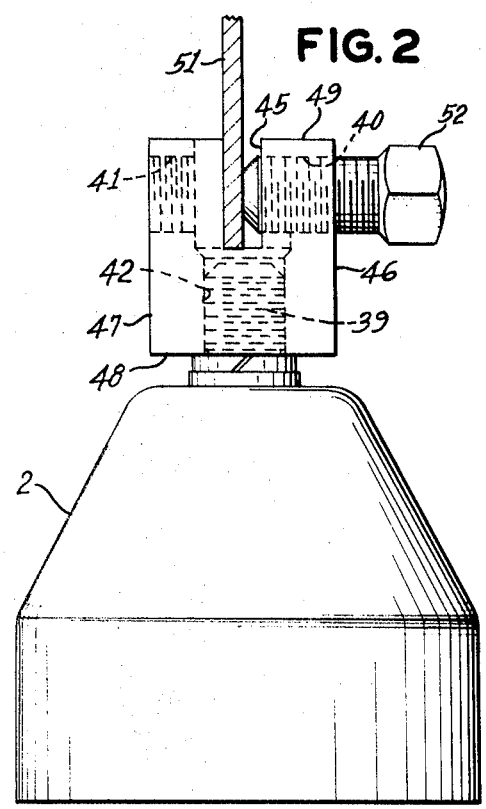
FIG. 2 is a side elevation of a high frequency source according to the invention.
Figure 3:
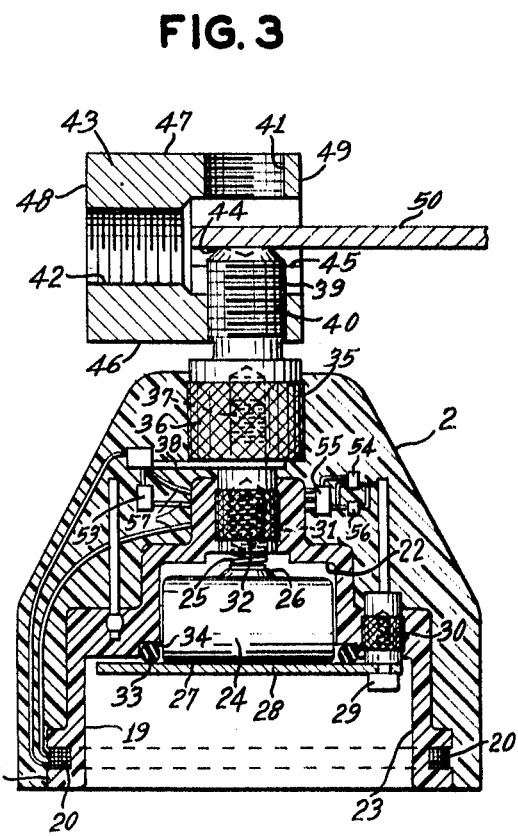
FIG. 3 is a sectional side view of the source shown in FIG. 2, the attachment arrangement being in a different orientation from that shown in FIG. 2.

Referring to FIGS. 2 and 3, the high frequency source 2 comprises an insulating inverted cuplike member 19 of synthetic resin material, for example, having a coil 20 formed around its lower end or rim portion 21. A reduced diameter upper portion 22 of the cavity 23 of the cuplike member is arranged to receive a long life battery 24, such as a mercury battery, a suitable contact 25 being provided for the positive center terminal 26 of the battery, and the negative shell terminal 27 of the battery being engaged by a conductive metal plate retainer 28 which is bolted, by bolts, such as bolt 29 threaded into a conductive metal bushing 30 molded integrally with the member 19. The contact 25 is shown as a spring member held in place in a cavity 31 in a conductive metal boss 32 molded integrally with the member 19. A rubber O-ring gasket 33 is provided between the plate 28 and a shoulder 34 defining the lower edge of the upper portion 22 of the cavity 23, to provide a seal for the upper portion of the cavity for protecting the battery. The plate 28 is removable upon removal of bolts 29 for replacement of the battery.

A mounting post 35 is provided with a lower portion 36 threaded on an upstanding projecting portion 37 of boss 32 and connects a lug 38 in firm electrical contact with boss 32. The upper end portion 39 of post 35 is threaded to be received into a selected one of internally threaded bores 40, 41 and 42 of a metal mounting block 43. The upper end of post 35 comprises a hardened sharp gripping edge 44 as seen in FIG. 3. The block 43 is provided with a slot 45 at right angles to bores 40 and 41 and aligned with bore 42. Bores 40 and 41 are coaxial and extend from respectively opposite faces 46 and 47 of the block and open into the slot 45, while bore 42 is perpendicular to bores 40 and 41 and enters through face 48 of the block opposite to face 49 across which the slot extends.

When post 35 is engaged in either of bores 40 and 41, a generally horizontal flange or the like lower portion of a vehicle frame or structural member, such as indicated at 50, may be locked to the block by screwing post 35 inwardly until its edge 44 bites into the portion 50 of the vehicle thereby rigidly to mount the source 2 on the vehicle. When the most convenient portion of the vehicle is a more nearly vertical than horizontal flange or the like member, such as seen at 51 in FIG. 2, the post 35 is screwed into bore 42 and a separate lock bolt 52 is screwed into one or the other of bores 40 and 41 to bite into the flange 51 or the like part of the vehicle. In mounting the transmitter unit or high frequency source 2, the coil 20 should be as nearly horizontal as possible for optimum inductive coupling with the detector loop. Angles of up to 45° to the horizontal, however, or even a greater angle, are permissable, particularly if the coil 20 is close to the ground, because coupling is reduced by only 30 percent for a 45° angle and by 50 percent for a 60° angle. The system is less critical as to adjustment of sensitivity if the coil 20 is at least generally horizontal, that is, if it is mounted at not more than a 45° angle to the horizontal.

Electronic elements of the high frequency source, such as condensers 53, 54, transistor 55, and resistor 56, together with connecting wires generally indicated at 57, are shown in FIG. 3, as being grouped outwardly around the member 19 and as being embedded in a block 58 of epoxy resin. The epoxy resin block permanently protects and embeds the coil 20, lug 38 and the portion 56 of post 35 in addition to all of the electrical components of the high frequency source with the exception of the replaceable battery. It will be understood that certain of the elements and certain of the connections of the oscillator are omitted from FIG. 3 for the sake of clarity, but that it is intended that all of the circuit elements be mechanically grouped and connected in the manner generally indicated in FIG. 3 while following the circuit diagram of FIG. 4.

Figure 4:
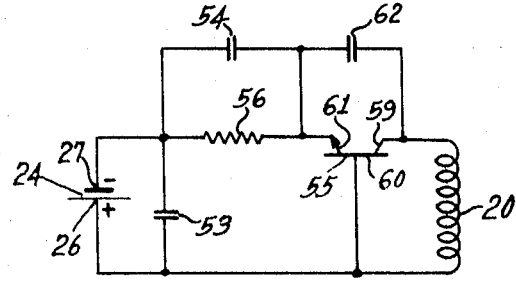
FIG. 4 is a circuit diagram of the high frequency source.

The electrical circuit of the high frequency source is shown in FIG. 4. The source comprises a colpitts oscillator wherein the coil 20, typically 40 turns on a 2 ½ inch diameter form, one-eighth inch wide, for an oscillator frequency of approximately 111 kilocycles, is connected from collector 59 to base 60 of NPN transistor 55, and the base is connected to the positive terminal 26 of 1.35 volt battery 24. The negative battery terminal 27 is connected through leak resistor 56, typically 2200 ohms, to the emitter 61 of transistor 55 and is by passed by capacitor 54 which may be 0.1 mfd. A capacitor 62, which may be 0.01 mfd., is connected between emitter 61 and collector 59 of the transistor, and a bypass capacitor 53, of about 0.1 mfd., is connected across the battery. With a type ME220A silicon transistor 55, this circuit may be expected to operate continuously to generate a weak signal at a frequency in the range of between 50 and 250 kilocycles for more than one year using a modern mercury battery 24. The oscillate may, according to the invention, be set to oscillate at a fixed frequency in this range, and, may, for example, be set to 111 kilocycles. Electromagnetic radiation from coil 20 is negligible with a coil diameter of the order of 2½ inches and frequencies of less than 200 or 300 kilocycles. The location of the coil under the metal vehicle and only about one foot from the ground, furthermore, results in substantial shielding of any radiation from the coil. Operation of the system is thus dependent upon inductive coupling between the coil 20 and a proximate pickup coil or loop 5 or 13 of a detector tuned for such coupling. It will be apparent that there should be no magnetic shielding under the coil 20, and that there should be no magnetic shielding so close to the coil as to interfere with operation of the oscillator. Electrostatic shielding has been found unnecessary but may, of course, be provided if desired. Sine loop 5 of the detector is flat upon or buried in the pavement, it tends to be highly inefficient as a receiving antenna for electromagnetic radiations, though capable of receiving sufficient signal from the coil 20 when the coil is brought within a foot or two thereof, through inductive coupling.

The circuit diagram of a detector 4, 5 is shown in FIG. 5. The detector comprises a power transformer primary 70 connected to a suitable 115 volt AC source 71 to supply approximately 22 volts AC from secondary 72 to full wave diode bridge circuit rectifier 73. The rectifier, which may comprise four type 10D6 diodes, supplies approximately 30 volts DC across filter capacitor 74, that is between 30 volt positive buss 75 and ground 76. This voltage is utilized for relay operation as later described and to furnish power to a voltage regulator circuit 77. The voltage regulator circuit comprises a series regulator transistor 78, typically of type ME220, with its collector 79 connected to the 30 volt positive buss 75 and its emitter 80 connected to 13 volt positive DC buss 81. Bias for transistor 78 is supplied by resistor 82, typically 2700 ohms, connected from collector 79 to base 83, and a 0.01 mfd. capacitor 84 is connected from base 83 to ground.

Control voltage is supplied to base 83 of transitor 78 from the collector 85 of a NPN transistor 86, which may also be of type ME220. Transistor 86 is controlled by a connection of its emitter 87 through a resistor 88 to buss 81 and through zenner diode 89 to ground and a connection of its base 90 through resistor 91 to ground and through zenner diode 92 to buss 81. Each of resistors 88 and 91 may be of 3300 ohms, and each of diodes 89 and 92 may be of the 1N754 type. Diode 89 is oriented with its cathode 93 connected to ground, and anode 94 of diode 92 is connected to buss 81.

Receiving loop 5 may comprise three turns in a generally rectangular loop 1 foot wide in the direction of travel of the vehicle and 8 feet long across the vehicle path. One end 95 of the loop is effectively grounded for radio frequency by connection through capacitor 96, of about 0.01 mfd. to ground and the other end 97 is connected to the base 98 of an NPN transistor 99 preferably through a coaxial conductor 100 with a grounded shield 101. The loop is tuned by means of a capacitor 102 and variable inductance 103 each connected in parallel thereto. For operation in the range of 100—150 kilocycles, capacitor 102 may be 0.05 mfd. and inductance 103 may be variable from 0.054 to 0.5 mh. to tune the circuit consisting of loop 4, capacitor 102 and inductance 103 to resonance to the desired frequency.

Bias for transistor 99 is obtained by a voltage divider comprising resistors 104 and 105 connected in series from buss 81 to ground, with the juncture connected to end 95 of loop 5. Resistor 104 may be of 56,000 ohms and resistor 105 of 10,000 ohms. Emitter 106 of transistor 99 is connected through resistor 107, which may be 120 ohms, to ground, while the collector 108 thereof is connected through variable inductance 109 to buss 81. Capacitor 110, which may be of 0.0015 mfd., is connected in parallel to inductance 109. The inductance 109 is variable from about 0.4 to 5.0 mh. and is adjusted to resonate with capacitor 110 at the selected frequency, such as 111 kilocycles, thereby to provide maximum impedance at that frequency.

Collector 108 is coupled through capacitor 111, of about 0.01 mfd., to the base 112 of an emitter follower NPN transistor 113, and transistors 99 and 113, with their associated circuit components, constitute a frequency selective amplifier stage to amplify the selected frequency, i.e. 111 kilocycles. Resistors 114 and 115, which may each of 100,000 ohms, are connected in series as a voltage divider from buss 81 to ground and at their juncture to base 112, while collector 116 of transistor 113 is directly connected to the 13 volt DC buss and emitter 117 is connected through a resistor 118, of about 10,000 ohms, to ground.

The signal appearing on emitter 117 is supplied through coupling capacitor 119, of about 0.01 mfd. to the base 120 of NPN transistor 121 which, with its associated components, constitutes a second frequency selective amplifier stage arranged to supply the amplified signal to a detector circuit comprising transistor 122. The base 120 of transistor 121 is biased by resistor 123, typically 56,000 ohms, and resistor 124, typically 10,000 ohms, connected from base 120 to buss 81 and to ground, respectively. Collector 125 of transistor 121 is connected to capacitor 126 and inductance 127 which may be identical to capacitor 110 and inductance 109 and which are similarly tuned to the selected frequency, such as 111 kilocycles. As with capacitor 110 and inductance 109, capacitor 126 and variable inductance 127 are connected in parallel between buss 81 and the collector of the respective amplifying transistor. The collector 125 of transistor 121 is also connected through coupling capacitor 128, typically of 0.01 mfd., to the base 129 of NPN transistor 122. Manually variable gain control resistor 130, which may have a range of 0—1000 ohms, and limit resistor 131, which may be 120 ohms, are connected in series from emitter 132 of transistor 121 to ground. The anode 133 of a diode 134 is connected to base 129 of transistor 122 and the cathode 135 thereof is grounded. The collector 136 of transistor 122 is connected through a resistor 137, which may be 100 ohms, to buss 81 and through a bypass capacitor 138, of about 0.47 mfd., to ground. Emitter 139 of transistor 122 connects to cathode 140 of diode 141 and the diode anode 142 is connected to the positive terminal 143 of a 0—1 ma. meter 144, of which the negative terminal 145 is connected to ground through a resistor 146 of, typically, 10,000 ohms, and this anode is further connected through a resistor 147, typically of 10,000 ohms, to the base 148 of a relay control transistor 149, typically a ME220A NPN type. It will be recognized that meter 144 and resistor 146 comprise a 0—10 volt DC voltmeter and the meter 144 may be appropriately so calibrated. A capacitor 150, typically 0.01 mfd., is connected in parallel with the series connected meter 144 and resistor 146. Diodes 134 and 141 are, typically, of IN914 type. When no signal of the selected frequency is being received by loop 5, the voltage on base 148 of the control transistor is zero, or substantially zero, and transistor 149 is cut off, i.e. nonconductive between its collector 151 and emitter 152. The collector-emitter circuit of transistor 149 is in series with coil 153 of output relay 154, the coil being connected between the 30 volt positive buss 75 and collector 151, while emitter 152 connects to collector 155 of a normally conductive transistor 156 of which the emitter 157 is grounded. Accordingly, when transistor 149 becomes conductive in response to a signal in loop 5, with transistor 156 normally conductive, energizing current passes through relay coil 153. A normally nonconductive diode 158, which may be of IN457 type, is connected across the relay coil to shunt current generated upon decay of the field in coil 153 when transistor 149 becomes nonconductive, thus to prevent high voltage damage to the coil or transistor 149.

Transistor 156 is employed in a squelch circuit and becomes nonconductive in the event of a man-made or atmospheric static pickup by loop 5. Base 159 of transistor 156 is normally maintained positive by a resistor 160, typically of 100,000 ohms, connected therefrom to buss 81. Static, however, causes a normally nonconductive transistor 161 to become conductive by the static signal applied from the anode of diode 141 through resistor 162, typically 10,000 ohms, to its base 163. The emitter 164 of transistor 161 is grounded, and its collector 165 is connected to the positive 13 volt buss through resistor 166, which may be of 10,000 ohms, and through capacitor 167 to base 159 of transitor 156. Capacitor 167 is typically 0.47 mfd. The charging time constant of the RC circuit connected to collector 165 is 4.7 milliseconds and the discharge time constant is 47 milliseconds, whereby the circuit responds to a static burst before relay 154 can operate, even though that burst may at the same time cause transistor 149 to become conductive, and whereby the effects of the burst disappear and transistor 156 returns to normal conductive condition more rapidly than a source 2 carried by a vehicle travelling at a few miles per hour could pass over loop 5.

Transistors 99, 113, 121, 122, 156 and 161 may each be NPN transistors of type ME220A.

When transistor 149 becomes conductive in normal operation in response to approach and presence of a source 2 closely adjacent loop 5, relay 154 picks up and becomes latched in, operating, in the specific system herein described, normally open contacts 168, 169 into closed position, normally closed contacts 170, 171 into open position, and normally open contacts 172, 173 into closed position. Closure of contacts 168, 169 completes a circuit across the 115 volt line through pilot light 18, whereby the arrival of a contract parker carrying a signal source 2 causes the light to go on and remain on until the vehicle passes out of the entrance area, that is, until it has actuated the second detector 13, 14 described in connection with FIG. 1. Contact 170 may be connected to treadle switch 9 through one of wires 10 shown in FIG. 1 and contact 171 may be connected to the ticket issuing device through one of wires 11, whereby opening of contacts 170, 171 disconnects the treadle switch from the ticket issuing device. A second stationary contact 174 is shown as normally not engaged by movable contact 171. Should it be desirable, contacts 174 and 171 may be connected to suitable relay means which may be within the ticket issuing device 12 and which may operate counting means therein when the contacts 174 and 171 are engaged, or it may be otherwise utilized to open a gate or for similar purposes.

An unlatch relay 175 is shown having normally closed contacts 176, 177. These contacts, when relay 175 is deenergized and when relay 154 is energized, establish a holding circuit from buss 75 through coil 153 and conductor 178 through contact 172 to contact 173 and thence, through contacts 177 and 176 to ground. Thus relay 154 remains energized as the source 2 departs from loop 5 until actuating voltage is applied to coil 179 of relay 175. Such actuating voltage may be applied by a switch closed when the vehicle reaches a desired position beyond the ticket issuing device. Such switch may be treadle operated by a treadle spaced along the entrance path of the vehicles, but otherwise identical to treadle 8 and switch 9 heretofore described. The passage of any vehicle will thus insure that relay 154 will be in dropped out condition before any following vehicle arrives. Alternatively, as is shown in FIG. 1, and as is indicated in phantom in FIG. 5, a second detector 14 comprising a loop 13 may be employed. This second detector may be identical to detector 4 as above described, with the exception that the holding circuit is omitted, such as by omitting conductor 178, or omitting the connection from contact 173 to contact 177, and by differently connecting the contacts of the output relay.

FIG. 5 shows in broken lines the cabinet 14 which contains contact 174', 170' corresponding to contacts 174, 170 of relay 154. When the second detector 13, 14 is energized by a source 2, contacts 174', 170' close, but close only momentarily, since there is no holding circuit for the output relay of detector 13, 14. Closing of contacts 170', 174' completes a circuit from buss 75 through wires 16 to terminal 180 of coil 179 of relay 175. The momentary operation of relay 175 opening contacts 176, 177 thus permits relay 154 to return to its normal dropped out condition shown in FIG. 5.

In the foregoing description of the circuits, values are set forth for the several components, and specific type designations are given for diodes and transistors. It will be understood that such values and types are intended to be illustrative and, of course, that other values and types may be selected by those skilled in the art.

While the above description is specific to a transmitter frequency of 111 kilocycles, and a detector tuned to that frequency, it is contemplated that each user of the system would select or be assigned a respective selected frequency or channel whereby the detector at any one parking facility would not respond to the transmitter tuned to another frequency which may have been supplied to the contract parkers of a different facility.

In the system as described it has been assumed that all of the transmitters 2 supplied for any one parking facility, or, for example, in use by the employees of any one company to gain admittance to the parking lot of that company, will be permanently factory adjusted or tuned to transmit at the same one frequency to be used by that facility or company. Of course, the vehicle might be provided with two sources 2 tuned respectively to the frequencies used by two parking facilities thus to gain admittance to each, or two parking facilities may have detectors tuned to the same frequency whereby vehicles carrying a source tuned to that frequency would be admitted to either.

Since transmitter or source 2, including coil 20, is located under the metal vehicle and near the ground, radiation from the coil is in part shielded and damped. Furthermore, the field strength of the field radiated by a loop is directly proportional to the product of the number of turns, the area of the loop, the loop current, and the square of the frequency, and this produce in the described equipment is very small. In the transmitter as described herein, the loop current may be approximately 7 microamperes, and the ideal field strength at 100 meters, assuming no shielding or absorption by the vehicle and no interference from earth reflections or other losses, would then be of the order of $10^{16}$ microvolts per meter. Such very low strength fields are, of course, undetectable by any ordinary receiving equipment. In part, the radiation field is made weak by utilizing frequencies of the order of 50 to 250 kilocycles, by using a coil having a diameter of only a few inches, in the preferred embodiment approximately 2½ inches, and by employing only a very small current in the coil.

The receiver gain is adjustable by means of variable resistor 138, and in a typical installation it may be so adjusted that the voltage on capacitor 150 increases to a value sufficient to cause control transistor 149 to conduct when a transmitter 2 has approached to within about one foot of loop 5. The output relay 154 is then actuated and remains in picked-up condition because of the closure of contacts 172, 173 in detector 4, 5. As the transmitter passes over each leg of the loop 5, the voltage on capacitor 150 faces substantially to zero and this voltage reaches a maximum when the transmitter is aligned above the center of the loop. Thus the voltage on capacitor 150 is not increased to the cutoff voltage for transistor 149 until a transmitter has approached to within about one foot of the loop and the capacitor voltage decreases to less than this cutoff voltage when the transmitter has passed about one foot beyond the loop. The voltage on capacitor 150 is indicated by meter 14 permitting an attendant to adjust the receiver gain to provide an appropriate voltage on capacitor 150 when a transmitter is in position above the loop.

Since inductive coupling between loop and coil is relatively independent of frequency, whereas electromagnetic radiation from the coil is proportional to the square of the frequency (assuming the same turn-amperes in the coil 20), it is desirable that the frequency be selected to be in the low radio frequencies. It is desirable that the source 2 be small, for reasons of economy, and to permit mounting in minimum space on the vehicle, and, further, to minimize change of damage. This small size thus limits the area of coil 20. It is also necessary, if the transmitter or high frequency source is to be continuously operative from a small self contained battery, and if the electromagnetic radiation from coil 20 is to be very low, that the power output of the oscillator be very small.

It has been found that, taking the above and like factors into account, a frequency of between about 50 and 150 kilocycles is most desirable, although the system is operable at radio frequencies higher or lower than this range. At frequencies below 50 kilocycles, the physical size of the components tends to be larger than desirable, while at frequencies higher than about 250 or 300 kilocycles, electromagnetic radiation begins to be a factor, although operation up to about 300 or even 400 kilocycles might be appropriate in special circumstance. Low radio frequencies as used herein, accordingly, is intended to include a range of from about 50 kilocycles to about 300 or 400 kilocycles, it being understood that from about 60 or 70 to about 150 kilocycles is the preferred range.

The electromagnetic radiation from the coil carrying 7 microamperes is of the order of $10^{15}$ or $10^{16}$ of what would be classed as radiating by the Federal Communications Commission, even if the damping effects due to the coil location under the vehicle are disregarded. Thus, as used herein, nonradiating is intended to mean an electromagnetic radiation field strength of less than about $10^{14}$ or $10^{15}$ millivolts per meter at 100 meters from the coil 20.

When is claimed as new and what it is desired to secure by Letters Patent of the United States is:

I claim:

1. In a system for selectively detecting the presence of a vehicle, a self-contained transmitter unit, said unit comprising a generally bell shaped body of insulating plastic material, electronic circuit elements embedded in said body above the lower rim portion thereof and a tank coil electrically connected thereto embedded in said rim portion and comprising therewith a low-power, fixed tuned, low radio frequency oscillator, a battery, said body being provided with a hollow battery housing chamber within its said rim portion and with a removable retaining plate retaining said battery within said housing, means embedded in said body connecting said battery to said components to continuously power said oscillator, said unit further comprising means for attaching said unit in fixed position on a vehicle underlying the body thereof and with said tank coil disposed generally horizontally and a detector comprising a horizontal loop disposed at approximately ground level in a path adapted to be traversed by such vehicle and arranged to receive energy by inductive coupling with said coil when said coil is in close proximity to said loop.

2. The combination according to claim 1, wherein the means for attaching the unit on a vehicle comprises a coupling block having a slot therein for receiving a portion of the vehicle and means for threadedly attaching said block to said body selectively in one and another position with respect thereto, said slot being perpendicular to the plane of said coil in one said position and parallel thereto in the other said position.

UNITED STATES PATENT OFFICE
CERTIFICATE OF CORRECTION

Patent No. 3,588,806              Dated June 28, 1971

Inventor(s)  Merton Wilcox

It is certified that error appears in the above-identified patent and that said Letters Patent are hereby corrected as shown below:

Column 4, line 60, the word "Sine" should read -- Since --
Column 8, line  7, "$10^{16}$" should read -- $10^{-6}$ --
         line 22, the word "faces" should read -- falls --
         line 41, the word "change" should read -- chance --
         line 62, "$10^{15}$" should read -- $10^{-5}$ --
         line 62, "$10^{16}$" should read -- $10^{-6}$ --
         line 67, "$10^{14}$" should read -- $10^{-4}$ --
         line 67, "$10^{15}$" should read -- $10^{-5}$ --

Signed and sealed this 23rd day of May 1972.

(SEAL)
Attest:

EDWARD M. FLETCHER, JR.                ROBERT GOTTSCHALK
Attesting Officer                       Commissioner of Patents